(12) United States Patent
Jung (10) Patent No.: US 11,845,574 B2
(45) Date of Patent: Dec. 19, 2023

(54) LANDING APPARATUS FOR A REUSABLE LAUNCH VEHICLE

(71) Applicant: KOREA AEROSPACE RESEARCH INSTITUTE, Daejeon (KR)

(72) Inventor: Dong Ho Jung, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 0 days.

(21) Appl. No.: 17/887,064

(22) Filed: Aug. 12, 2022

(65) Prior Publication Data

US 2023/0065916 A1 Mar. 2, 2023

(30) Foreign Application Priority Data

Aug. 24, 2021 (KR) .................. 10-2021-0111574

(51) Int. Cl.
*B64G 1/62* (2006.01)
*B64G 1/00* (2006.01)

(52) U.S. Cl.
CPC .............. *B64G 1/625* (2023.08); *B64G 1/006* (2023.08)

(58) Field of Classification Search
CPC ........ B64G 1/625; B64G 1/006; B64G 1/002; B64G 1/62; B64C 2025/325; B64U 60/50
See application file for complete search history.

(56) References Cited

U.S. PATENT DOCUMENTS

| 8,424,808 | B2 | 4/2013 | Boelitz | |
| 2016/0096613 | A1* | 4/2016 | Johnson | B64C 29/04 244/13 |
| 2017/0283042 | A1* | 10/2017 | Gamble | B64D 47/08 |
| 2018/0304984 | A1* | 10/2018 | Zheng | B64D 47/08 |
| 2020/0174478 | A1* | 6/2020 | Abdellatif | G08G 5/0069 |
| 2021/0107645 | A1* | 4/2021 | Izraelevitz | B64C 1/30 |

FOREIGN PATENT DOCUMENTS

| CN | 109911252 A | 6/2019 |
| KR | 1020130060855 A | 6/2013 |
| KR | 1020170044832 A | 4/2017 |

\* cited by examiner

*Primary Examiner* — Brady W Frazier
*Assistant Examiner* — Shanna Danielle Glover
(74) *Attorney, Agent, or Firm* — Rabin & Berdo, P.C.

(57) ABSTRACT

A landing apparatus for a reusable launch vehicle is provided, including a landing leg pivotably mounted at one end to the reusable launch vehicle, for example, to a propellant tank part, and mounted at the other end to the propellant tank part by a detaching means such as a pyro bolt for example, a cover mounted to an outside of the landing leg along a longitudinal direction of the landing leg, and a leg landing plate mounted to a distal end of the landing leg and relatively pivotable with respect to the landing leg by its own weight when the other end of the landing leg is separated from the propellant tank part.

6 Claims, 12 Drawing Sheets

__LANDING APPARATUS FOR A REUSABLE LAUNCH VEHICLE__

CROSS-REFERENCE TO RELATED APPLICATION

This application claims priority to Korean Patent Application No. 10-2021-0111574, filed in the Korean Intellectual Property Office on Aug. 24, 2021, the entire contents of which are hereby incorporated by reference.

TECHNICAL FIELD

The present disclosure relates to a landing apparatus for a reusable launch vehicle.

BACKGROUND

A reusable launch vehicle (RLV) refers to a launch vehicle that can be reused like an aircraft, as opposed to a general expendable space launch vehicle. In a normal space launch vehicle, the first stage of the rocket is usually disposed in the sea, whereas in the reusable launch vehicle, the first stage rocket is landed on the ground for being reused to launch the launch vehicle. In particular, considering that the first stage launch vehicle involves intensive rocket thrust and its cost accounts for a significant portion of the total cost, the cost reduction effect by reusing the launch vehicle is significant.

To this end, a need arises for a landing apparatus with a simple structure that can stably land the first stage rocket of a reusable launch vehicle on the ground.

SUMMARY

In order to solve one or more problems (e.g., the problems described above and/or other problems not explicitly described herein), an object of the present disclosure is to provide a landing apparatus for a reusable launch vehicle that can stably land the reusable launch vehicle on the ground with a simple structure.

In order to achieve the above objects, a landing apparatus for a reusable launch vehicle is provided, which may include a landing leg pivotably mounted at one end to the reusable launch vehicle, and selectively detachably mounted at the other end to the reusable launch vehicle, a cover mounted to an outside of the landing leg along a longitudinal direction of the landing leg, and a leg landing plate mounted to a distal end of the landing leg and relatively pivotable with respect to the landing leg by its own weight when the other end of the landing leg is separated from the reusable launch vehicle.

In addition, the landing leg may be an extendable multi-stage cylinder.

In addition, the one end of the landing leg may be pivotably mounted to an upper mount frame of the reusable launch vehicle, and an upper cylinder of the multi-stage cylinder may be provided with a protrusion, such that, when the landing leg is pivoted by a predetermined angle with respect to the reusable launch vehicle, the protrusion comes into contact with the upper mount frame to prevent the landing leg from being pivoted further.

In addition, a point at which the one end of the landing leg is mounted to the upper mount frame may be positioned higher than a center of gravity of the reusable launch vehicle.

In addition, the landing apparatus for a reusable launch vehicle may include a detaching means for fixing the other end of the landing leg to the reusable launch vehicle in a manner such that the other end is selectively detachable from the reusable launch vehicle.

In addition, during a landing of the reusable launch vehicle, when the distal end of the landing leg is separated from the reusable launch vehicle by the detaching means, the cover may spread by air resistance, and the landing leg may be extended in its longitudinal direction.

In addition, the detaching means may include a pyro bolt 4.

In addition, the upper mount frame may be fixed to a Y-ring part of a propellant tank part of the reusable launch vehicle.

According to some examples of the present disclosure, the landing apparatus for a reusable launch vehicle has a simple structure and can be used to efficiently and stably land the first stage of the launch vehicle rocket on the ground.

Meanwhile, although the present disclosure is not explicitly described, it also includes other effects that can be expected from the configuration described above.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Hereinafter, preferred embodiments of the present disclosure will be described in detail with reference to the accompanying drawings, which will be readily apparent to those skilled in the art to which the present disclosure pertains. However, it will be understood that the present disclosure can be implemented in various other different forms and should not be construed as being limited to certain examples described herein.

Figure 1:
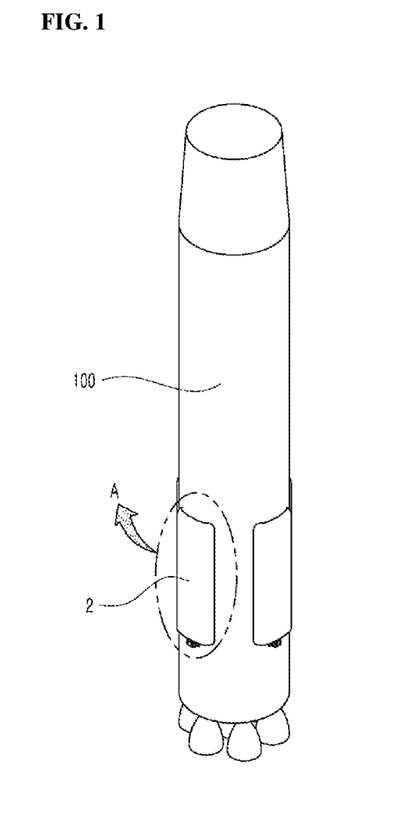
FIG. 1 is a schematic diagram of a landing apparatus for a reusable launch vehicle, illustrating landing legs in an non-deployed state.
Figure 2:
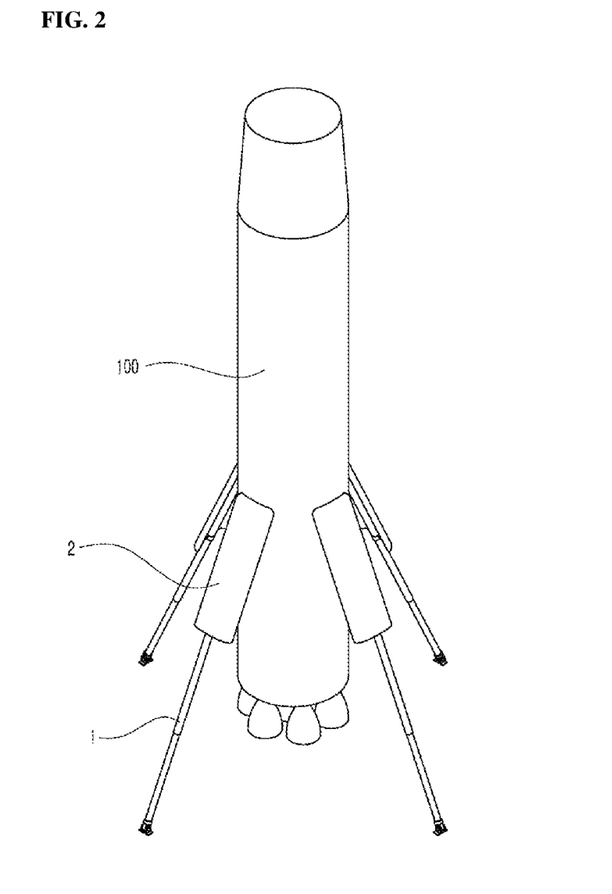
FIG. 2 is a schematic diagram of a landing apparatus for a reusable launch vehicle, illustrating landing legs in a deployed state.
Figure 3:
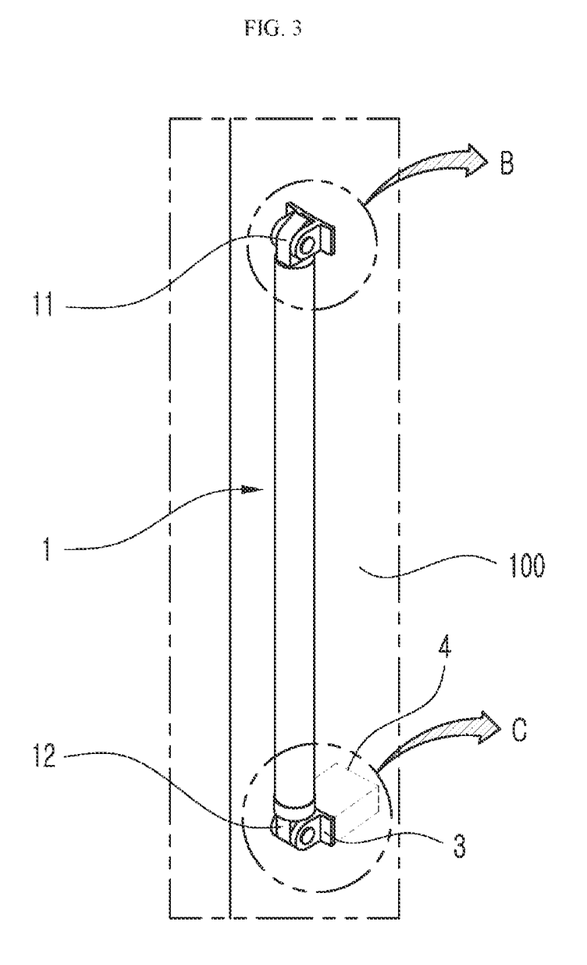
FIG. 3 is a partially enlarged view of the encircled part A of FIG. 1 (cover not illustrated)

For reference, FIG. 1 is a schematic diagram of a landing apparatus for a reusable launch vehicle, illustrating landing legs in a non-deployed state, FIG. 2 illustrates the landing legs in a deployed state, and FIG. 3 is a partially enlarged view of the encircled part A of FIG. 1. The landing apparatus for a reusable launch vehicle according to an example includes landing legs 1, a cover 2, and leg landing plates 3, as main components.

Figure 4:
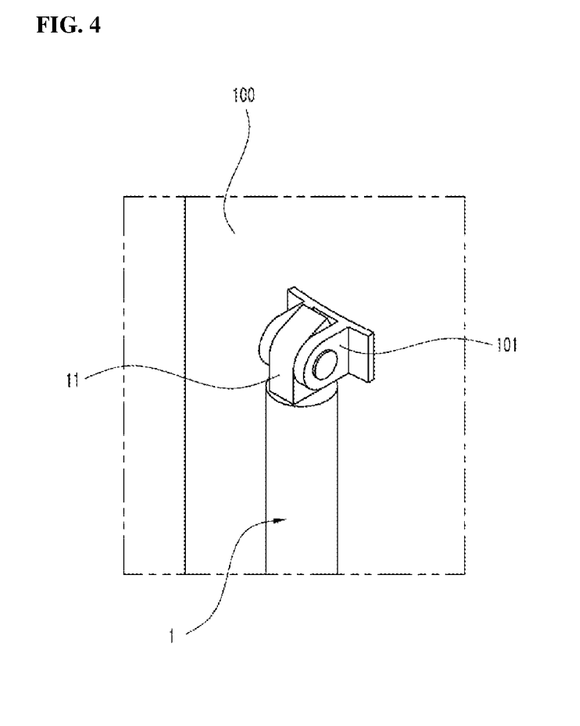
FIG. 4 is a partially enlarged view of the encircled part B of FIG. 3.

As illustrated in FIGS. 1, 3 and 4, one end 11 of the landing leg 1 may be pivotably mounted to the reusable launch vehicle, and the other end 12 may be selectively detachably mounted to the reusable launch vehicle. For the purpose of explanation, an example will be described, in which the one end 11 of the landing leg 1 is mounted to a propellant tank part 100 of the reusable launch vehicle, but it is obvious that the present disclosure is not limited thereto.

The landing apparatus for a reusable launch vehicle may further include a detaching means for fixing the other end 12 of the landing leg 1 to the reusable launch vehicle in a manner such that the other end 12 is selectively detachable from the reusable launch vehicle. For example, the detaching means may be a pyro bolt 4.

Specifically, as illustrated in FIG. 4, the one end 11 of the landing leg 1 may be pivotably mounted to the reusable launch vehicle, for example, to an upper mount frame 101 of the propellant tank part 100. The upper mount frame 101 is fixed to a ring part of the propellant tank part 100, that is, to a known Y-ring part 102 that is mounted to the propellant tank part 100 in an annular shape. Typically, the Y-ring part 102 is known as structurally the most robust component of the propellant tank part 100.

Figure 6:
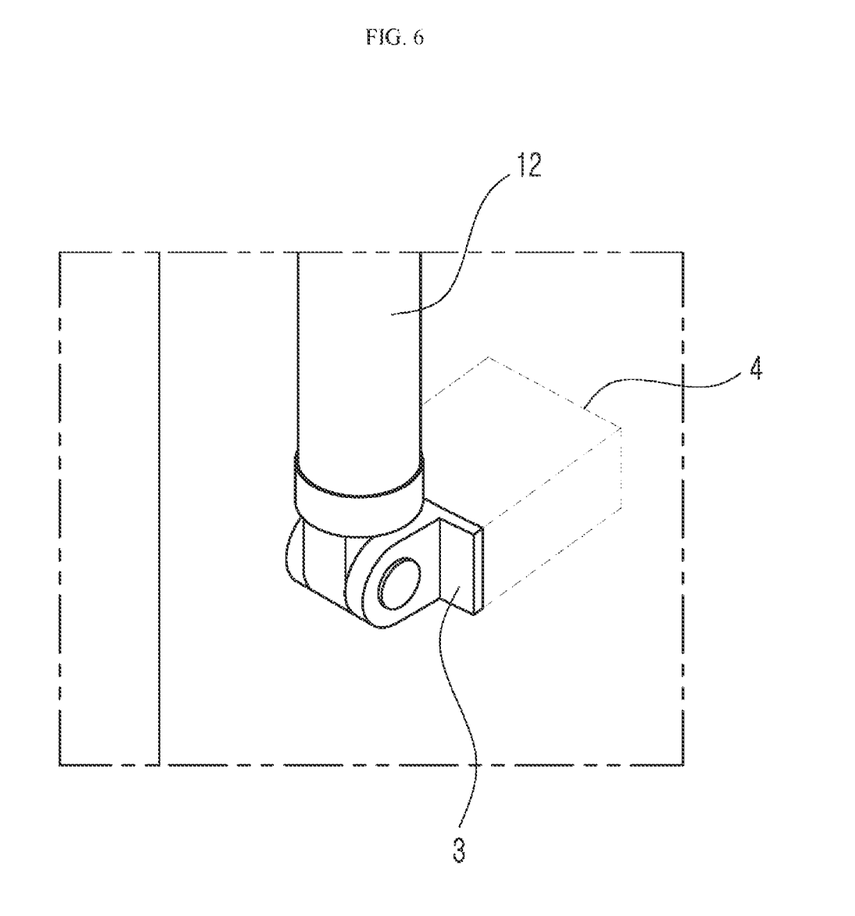
FIG. 6 is a partially enlarged view of the encircled part C of FIG. 3.

As illustrated in FIG. 6, the other end 12 of the landing leg 1 may be mounted to the reusable launch vehicle, that is, to the propellant tank part 100 by a detaching means such as a pyro bolt 4, for example. For reference, the pyro bolt 4 is a type of bolt that contains a pyrotechnic charge that can be initiated remotely, and the pyrotechnic charge embedded in the bolt is generally activated by an electric current, severing the bolt. Such a pyro bolt 4 is already widely known for its use in combining and separating components, and since it is not related to the gist of the present disclosure, an additional description thereof will be omitted.

Meanwhile, the landing leg 1 may be a pneumatically or hydraulically extendable multi-stage cylinder 1. As illustrated in FIG. 1, it is maintained in the folded state, and extended to the deployed state upon landing, as illustrated in FIG. 2. By way of example, a multi-stage cylinder consists of three stages and four landing legs are mounted. In addition, the landing leg 1 has an air damping function to serve as a buffer for soft landing when the reusable launch vehicle is landed.

Figure 5:
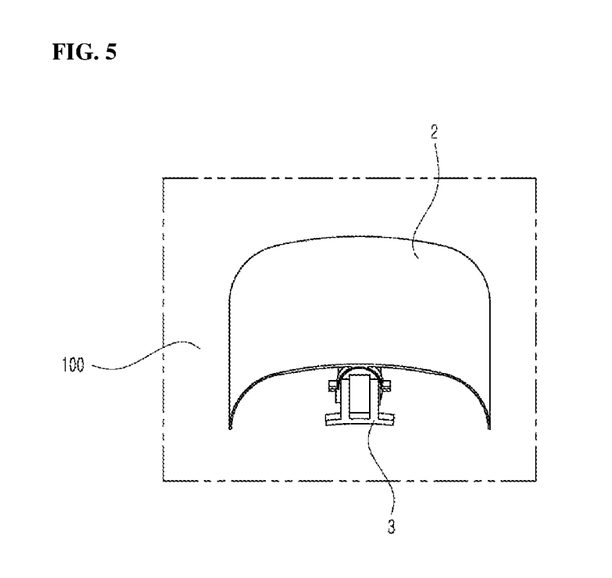
FIG. 5 shows a cover of the landing apparatus for a reusable launch vehicle of FIG. 1, when viewed from below.

The cover 2 is mounted to the outside of the landing leg 1 along a longitudinal direction of the landing leg 1, that is, along the extension direction of the multi-stage cylinder. The cover 2 has an approximately rectangular shape, with left and right ends being gently bent in a direction of surrounding the landing leg 1 (see FIG. 5). With this, the cover 2 can receive a good lift when the air flows into the inside thereof. Thus, the cover can serve as a parachute upon landing of the reusable launch vehicle.

Figure 7A:
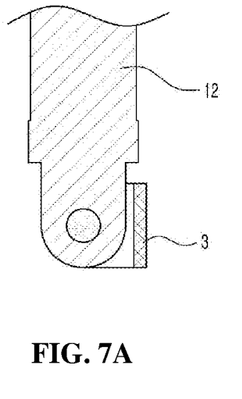
FIG. 7A illustrates a leg landing plate before being pivoted.
Figure 7B:
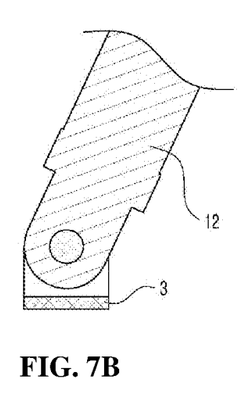
FIG. 7B illustrates the leg landing plate after being pivoted toward the ground.

As illustrated in FIGS. 6 and 7, the leg landing plate 3 is mounted to a distal end of the landing leg 1, and when the other end 12 of the landing leg 1 is separated from the propellant tank part 100, the leg landing plate 3 is relatively pivotable with respect to the landing leg 1 by its own weight. For reference, FIG. 7A illustrates the leg landing plate 3 in contact with the propellant tank part 100, and FIG. 7B shows the leg landing plate 3 after being pivoted downward by its own weight to face the ground direction according to the breakage of the detaching means (pyro bolt 4).

Figure 8A:
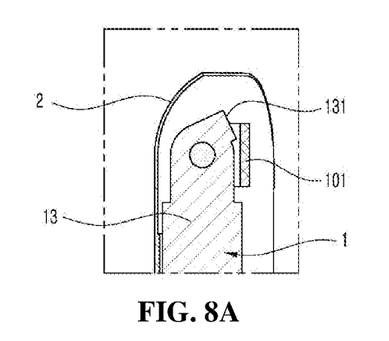
FIG. 8A illustrates a lower part of the landing leg before separating from the reusable launch vehicle.
Figure 8B:
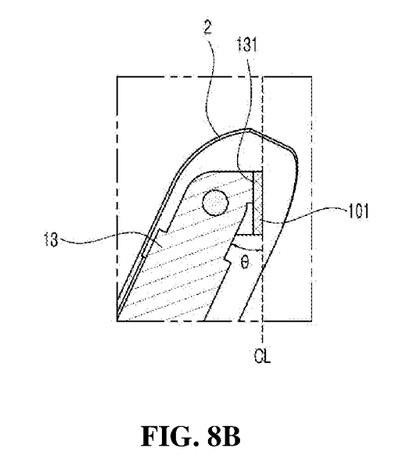
FIG. 8B illustrates the landing leg after being pivoted by a predetermined angle with respect to the reusable launch vehicle.

Meanwhile, as illustrated in FIG. 8, the landing leg 1, that is, an upper cylinder 13 of the multi-stage cylinder 1 is provided with a protrusion 131, such that, when the landing leg 1 is pivoted with respect to the propellant tank part 100 by a predetermined angle θ, the protrusion 131 comes into contact with an upper mount frame 101 and serves as a leg stopper that prevents the landing leg 1 from being pivoted further.

Figure 9:
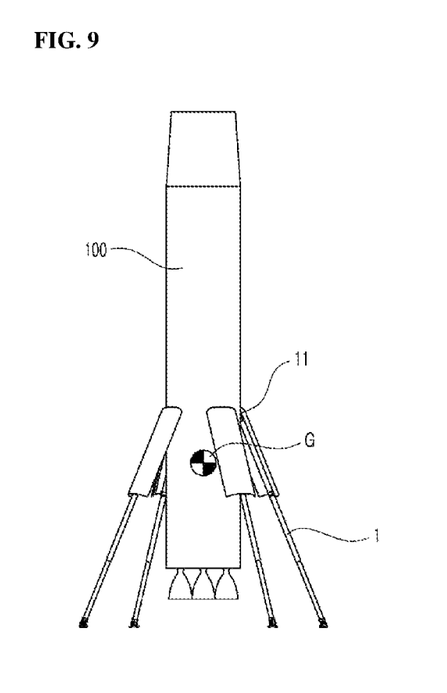
FIG. 9 illustrates the landing legs with one ends positioned above the center of gravity of the reusable launch vehicle.
Figure 10:
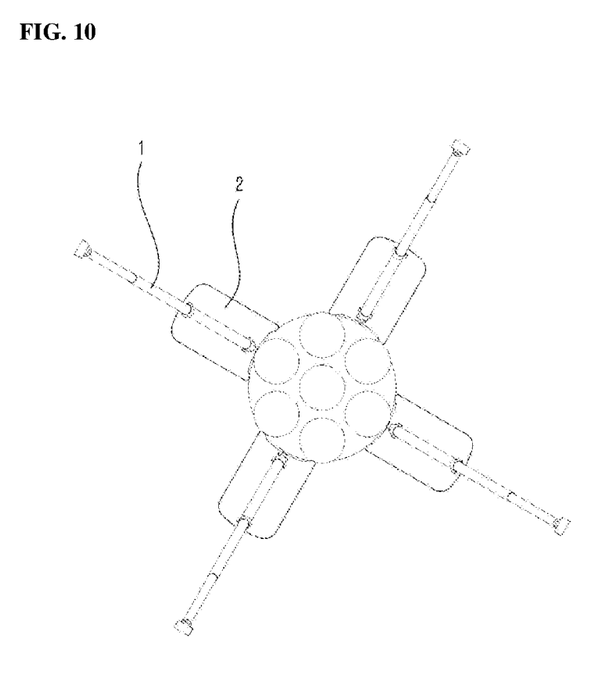
FIG. 10 illustrates the landing legs in deployed state of FIG. 2, viewed from the bottom of the reusable launch vehicle.
Figure 11A:
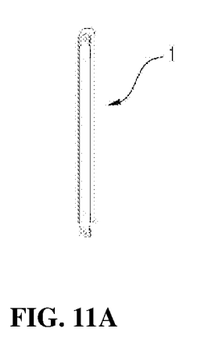
FIG. 11A illustrates a landing leg in a folded state.
Figure 11B:
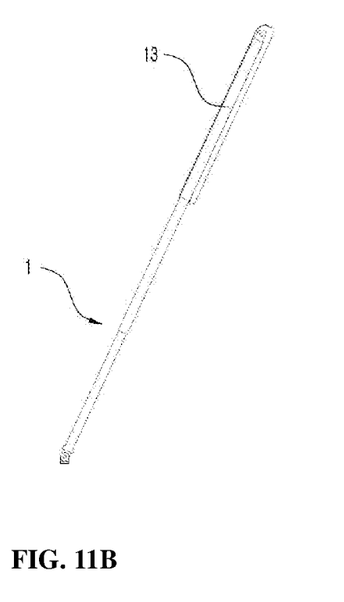
FIG. 11B illustrates a landing leg in an extended state.
Figure 12:
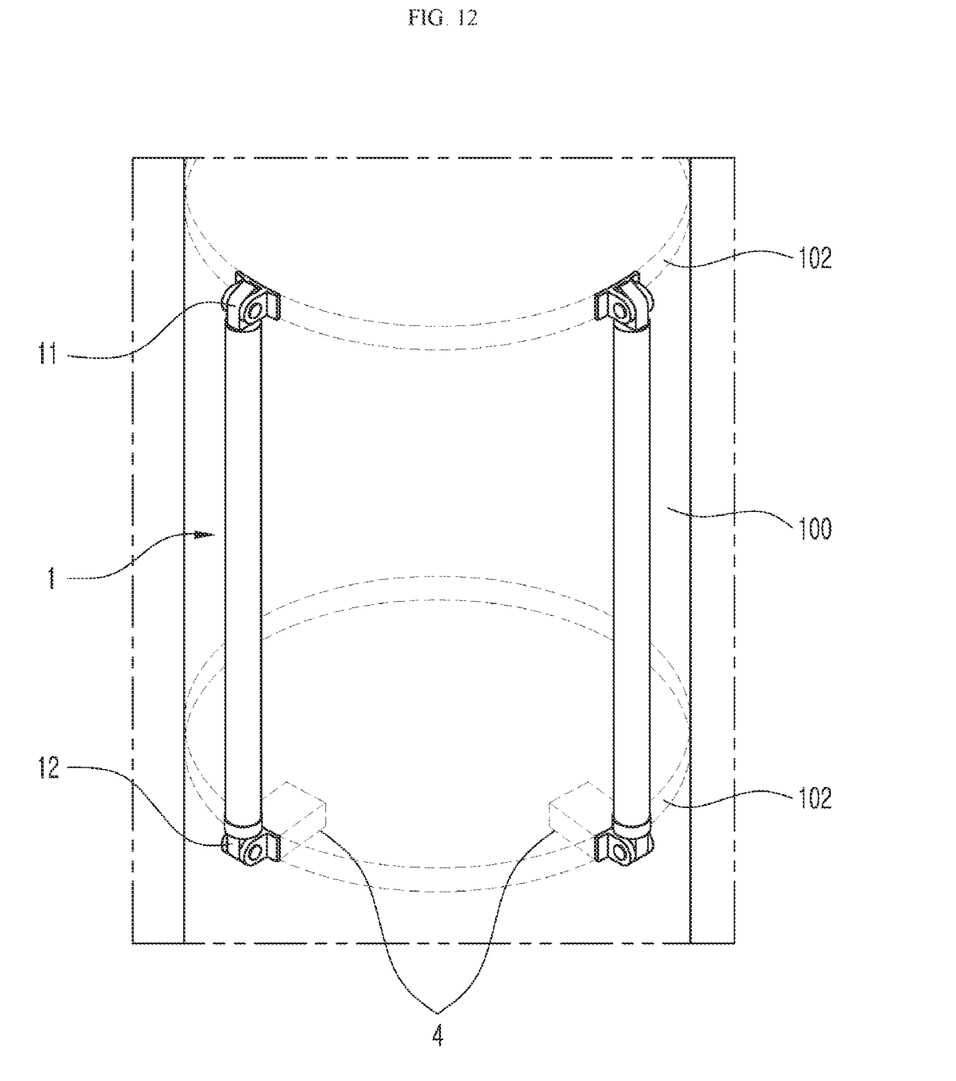
FIG. 12 is a schematic diagram of the landing apparatus of FIG. 1, which shows a known Y-ring part.

As illustrated in FIG. 9, in the landing apparatus for a reusable launch vehicle according to an example, the point at which the one end 11 of the landing leg 1 is mounted to the reusable launch vehicle (upper mount frame) may be positioned higher than the center of gravity G of the reusable launch vehicle, thereby ensuring structural stability.

Hereinafter, the operation of the landing apparatus for a reusable launch vehicle having the configuration as described above will be described.

First, as illustrated in FIG. 1, the reusable launch vehicle approaches the ground with the landing leg 1 in folded state.

As illustrated in FIG. 2, when the reusable launch vehicle is landing, the distal end of the landing leg 1 is separated from the propellant tank part 100 according to the breakage of the detaching means (pyro bolt 4), and the cover 2 is unfolded by air resistance and lift. At this time, the cover 2 may serve as a parachute.

When the landing leg 1 is pivoted with respect to the propellant tank part 100 by a predetermined angle θ, the protrusion 131 of the landing leg 1 comes into contact with the upper mount frame 101 fixed to the propellant tank part 100, thereby preventing the landing leg 1 from being pivoted further.

As the multi-stage cylinder of the landing leg 1 extends in the longitudinal direction, the landing leg 1 is unfolded.

When the other end 12 of the landing leg 1 is separated from the propellant tank part 100, the leg landing plate 3 mounted at the distal end of the landing leg 1 is pivoted by its own weight to face the ground.

As described above, the landing apparatus for a reusable launch vehicle according to examples of the present disclosure has a simple structure and can be used to efficiently and stably land the first stage of the launch vehicle rocket on the ground.

Although the present disclosure has been described in connection with some examples herein, the present disclosure should not be limited to those examples only, and various other changes and modifications made by those skilled in the art from the basic concept of the disclosure are also within the scope of the claims appended herein.

The invention claimed is:

1. A reusable launch vehicle including a landing apparatus, the landing apparatus comprising:
   a landing leg pivotably mounted at one end to the reusable launch vehicle, and mounted to be selectively detachable from the other end to the reusable launch vehicle;
   a cover pivotably mounted to the landing apparatus to cover an outside of the landing leg near the one end;
   a leg landing plate mounted at the other end of the landing leg and relatively pivotable with respect to the landing leg by its own weight when the other end of the landing leg is separated from the reusable launch vehicle; and a mechanism configured to detachably fix the other end of the landing leg to the reusable launch vehicle in a manner such that the other end is selectively detachable from the reusable launch vehicle, wherein, during landing of the reusable launch vehicle, when the other end of the landing leg is separated from the reusable launch vehicle by the mechanism, the cover is configured to be spread by way of air resistance, and the landing leg is configured to extend longitudinally along the landing leg.

2. The reusable launch vehicle according to claim 1, wherein the landing leg is an extendable multi-stage cylinder.

3. The reusable launch vehicle according to claim 2, wherein the one end of the landing leg is pivotably mounted to an upper mount frame of the reusable launch vehicle, and an upper cylinder of the multi-stage cylinder is provided with a protrusion, such that, when the landing leg is pivoted by a predetermined angle with respect to the reusable launch vehicle, the protrusion comes into contact with the upper mount frame to prevent the landing leg from being pivoted further.

4. The reusable launch vehicle according to claim 3, wherein a point at which the one end of the landing leg is mounted to the upper mount frame is positioned higher than a center of gravity of the reusable launch vehicle.

5. The reusable launch vehicle according to claim 1, wherein the mechanism comprises a pyro bolt.

6. The reusable launch vehicle according to claim 3, wherein the upper mount frame is fixed to a Y-ring part of a propellant tank part of the reusable launch vehicle.

* * * * *